US008412702B2

(12) United States Patent
Cozzi

(10) Patent No.: US 8,412,702 B2
(45) Date of Patent: Apr. 2, 2013

(54) SYSTEM, METHOD, AND/OR APPARATUS FOR REORDERING SEARCH RESULTS

(75) Inventor: Alex Cozzi, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 544 days.

(21) Appl. No.: 12/047,069

(22) Filed: Mar. 12, 2008

(65) Prior Publication Data

US 2009/0234834 A1    Sep. 17, 2009

(51) Int. Cl.
G09F 17/30    (2011.01)
(52) U.S. Cl. ......... 707/723; 707/737; 707/752; 707/765
(58) Field of Classification Search .................. 707/706, 707/723, 728, 732, 752, 754, 765, 73
See application file for complete search history.

(56) References Cited

U.S. PATENT DOCUMENTS

| | | | |
|---|---|---|---|
| 5,802,515 A * | 9/1998 | Adar et al. ..................... 707/723 |
| 5,987,446 A | 11/1999 | Corey et al. |
| 6,021,409 A | 2/2000 | Burrows |
| 6,202,063 B1 * | 3/2001 | Benedikt et al. .............. 707/765 |
| 6,701,311 B2 | 3/2004 | Biebesheimer et al. |
| 6,772,139 B1 | 8/2004 | Smith, III |
| 7,031,961 B2 * | 4/2006 | Pitkow et al. .......................... 1/1 |
| 7,058,944 B1 | 6/2006 | Sponheim et al. |
| 7,631,263 B2 * | 12/2009 | Morris ........................... 715/738 |
| 7,693,827 B2 * | 4/2010 | Zamir et al. ........... 707/999.003 |
| 7,761,447 B2 * | 7/2010 | Brill et al. ...................... 707/728 |
| 2002/0103789 A1 * | 8/2002 | Turnbull et al. .................. 707/3 |
| 2003/0120654 A1 | 6/2003 | Edlund et al. |
| 2004/0098380 A1 | 5/2004 | Dentel et al. |
| 2004/0260679 A1 * | 12/2004 | Best et al. ........................... 707/3 |
| 2005/0065802 A1 * | 3/2005 | Rui et al. ............................ 705/1 |
| 2005/0071328 A1 * | 3/2005 | Lawrence .......................... 707/3 |
| 2005/0216454 A1 | 9/2005 | Diab et al. |
| 2006/0004711 A1 | 1/2006 | Naam |
| 2006/0026013 A1 | 2/2006 | Kraft |
| 2006/0074883 A1 | 4/2006 | Teevan et al. |
| 2006/0167857 A1 | 7/2006 | Kraft et al. |
| 2006/0235860 A1 | 10/2006 | Brewer et al. |
| 2006/0294086 A1 | 12/2006 | Rose et al. |
| 2007/0033171 A1 | 2/2007 | Trowbridge |
| 2007/0050335 A1 * | 3/2007 | Kashima et al. .................. 707/3 |
| 2007/0073669 A1 | 3/2007 | Kraft |
| 2007/0074102 A1 | 3/2007 | Kraft et al. |
| 2007/0100801 A1 * | 5/2007 | Celik et al. ........................ 707/3 |
| 2007/0106657 A1 | 5/2007 | Brzeski et al. |
| 2007/0143260 A1 * | 6/2007 | Markov et al. ................ 707/769 |
| 2007/0214131 A1 * | 9/2007 | Cucerzan et al. ................. 707/5 |
| 2007/0266025 A1 * | 11/2007 | Wagner et al. .................... 707/7 |
| 2007/0271247 A1 * | 11/2007 | Best et al. ......................... 707/3 |
| 2007/0271255 A1 | 11/2007 | Pappo |
| 2007/0283291 A1 * | 12/2007 | Morris .......................... 715/804 |

(Continued)

OTHER PUBLICATIONS

"Google Experimental Search Adds Personalized Page Ranking" Wired Blog Network, 1 page, http://blog.wired.com/monkeybites/2007/11/google-experime.html.

(Continued)

*Primary Examiner* — John E Breene
*Assistant Examiner* — Andalib Lodhi
(74) *Attorney, Agent, or Firm* — Berkeley Law & Technology Group, LLP

(57) ABSTRACT

Embodiments of methods, apparatuses, devices and systems associated with modifying search results are disclosed.

22 Claims, 7 Drawing Sheets

U.S. PATENT DOCUMENTS

| | | | |
|---|---|---|---|
| 2007/0288492 A1* | 12/2007 | Chen et al. | 707/100 |
| 2008/0010252 A1 | 1/2008 | Zamir et al. | |
| 2008/0021755 A1* | 1/2008 | Jones et al. | 705/8 |
| 2008/0031670 A1* | 2/2008 | Kim et al. | 399/405 |
| 2008/0033970 A1* | 2/2008 | Jones et al. | 707/100 |
| 2008/0147640 A1* | 6/2008 | Schachter | 707/5 |
| 2008/0235187 A1 | 9/2008 | Gade et al. | |
| 2008/0243830 A1* | 10/2008 | Abhyanker | 707/5 |
| 2009/0106257 A1 | 4/2009 | Iskold et al. | |
| 2009/0119278 A1* | 5/2009 | Cross et al. | 707/5 |

OTHER PUBLICATIONS

International Search Report and Written Opinion in PCT Application Serial No. PCT/US2009/001119 mailed Aug. 27, 2009, 8 pages.

Notification Concerning Transmittal of International Preliminary Report on Patentability, International Application No. PCT/US2009/001119, 7 pages.

"See and Find Quintura" Quintura, Inc., http://www.quintura.com, 1 page, retrieved from the World Wide Web on Mar. 14, 2008.

Agichtein et al., "Improving Web Search Ranking by Incorporating User Behavior Information" SIGIR 06, Aug. 6-11, 2006, Seattle, WA, 8 pgs.

Kraft et al., "Searching with Context" WWW 2006, May 23-26, 2006, Edinburgh, Scotland, 10 pgs.

Kraft et al., Y!Q: Contextual Search at the Point of Inspiration: CIKM 05, Oct. 31-Nov. 5, 2005, Bremen, Germany, 8 pgs.

Kraft et al., "Mining Anchor Text for Query Refinement" WWW 2004, May 17-22, 2004, New York, NY, 9 pgs.

U.S. Appl. No. 12/048,792, filed Feb. 14, 2008, 43 pages.

U.S. Appl. No. 12/048,792: Filing Receipt, mailed Mar. 25, 2008, 3 pages.

U.S. Appl. No. 12/048,79: Notice of Publication, mailed Sep. 17, 2009, 1 page.

U.S. Appl. No. 12/048,792: Non-Final Office Action, mailed Jun. 9, 2010, 14 pages.

U.S. Appl. No. 12/048,792: Request for Reconsideration-After Non-Final Office Action, mailed Sep. 9, 2010, 14 pages.

U.S. Appl. No. 12/048,792: Final Office Action, mailed Nov. 19, 2010, 17 pages.

U.S. Appl. No. 12/048,792: Request for Continued Examination, mailed Feb. 22, 2011, 23 pages.

U.S. Appl. No. 12/048,792: Non-Final Office Action, mailed Mar. 3, 2011, 27 pages.

U.S. Appl. No. 12/048,792: Letter Restarting Period for Response, mailed Mar. 29, 2011, 27 pages.

U.S. Appl. No. 12/112,721, filed Apr. 30, 2008, 46 pages.

U.S. Appl. No. 12/112,721: Filing Receipt, mailed Jun. 17, 2008, 3 pages.

U.S. Appl. No. 12/112,721: Notice of Publication, mailed Nov. 5, 2009, 1 page.

U.S. Appl. No. 12/112,721: Non-Final Office Action, mailed Aug. 2, 2010, 16 pages.

U.S. Appl. No. 12/112,72: Request for Reconsideration-After Non-Final Office Action, mailed Nov. 2, 2010, 21 pages.

U.S. Appl. No. 12/112,721: Final Office Action, mailed Jan. 6, 2011, 20 pages.

U.S. Appl. No. 12/112,721: Request for Continued Examination, mailed Apr. 6, 2011, 23 pages.

U.S. Appl. No. 12/437,043, filed May 7, 2009, 42 pages.

U.S. Appl. No. 12/437,043: Filing Receipt, mailed May 21, 2009, 3 pages.

U.S. Appl. No. 12/437,043: Notice of Publication, mailed Nov. 12, 2010, 1 page.

U.S. Appl. No. 12/437,043: Non-Final Office Action, mailed Apr. 28, 2011, 19 pages.

PCT/US2009/001119: Initial publication of application on Sep. 17, 2009, 28 pages.

PCT/US2009/001119: International Preliminary Report on Patentability, mailed Sep. 14, 2010, 6 pages.

EP2266062: Claim amendments to EP application, mailed Nov. 25, 2010, 8 pages.

EP2266062: Supplementary EP search report and EP search opinion, mailed May 9, 2011, 5 pages.

\* cited by examiner

Yahoo! My Yahoo! Mail Welcome, alexcozzi Sign Out Help

YAHOO!

Web Images Video Local Shopping more ▶

[black cat] [Search] Options ▶
  402

1-10 of 129,000,000 for black cat (About) 0.09 sec    SPONSOR RESULTS

Also try: the black cat edgar allan poe, black cat anime, black cat dc, More...

✂ BACK CAT - A Washington DC Night Club
Premier live music venue.
www.blackcatdc.com - 7k - Cached ✂ Black Cat Fireworks - Black Cat Fireworks - The Best You Can Get
Manufacturer of fireworks and firecrackers.
www.blackcatfireworks.com - 10k - Cached ✂ Black Cat - Wikipedia, the free encyclopedia
Historically, black cats were symbolically associated with...decided to use the black cat because in China black cats are a symbol of good luck. ...
Quick Links: Historical associations - Witchcraft and superstition - Anarcho-Syndicalism
en.wikipedia.org/wiki/Black_cat - 17k - Cached ✂ BLACK CAT - A Washington DC Night Club
Fri Jan 11-BLACK CATatonia: 80s, hip hop, soul, electronica dance night w ... 6-STRIKE ANYWHERE, PAINT IT BLACK, RIVERBOAT GAMBLERS $12 Mainstage 8:00 ...
www.blackcatdc.com/schedule.html - 17k - Cached ✂ ...... BLACK CATS ... SCREAM OF THE CATS ......
MAC users need to download OPERA internet browser in order to view this site. In order to fully enjoy the site please turn off your POP-UP blocker ...
www.blackcats.net - 3k - Cached ✂ Black Cats
  Black cats are discussed as mysterious and mythical creatures that have been ... if a black cat on the one side of the world suffers misfortune at the hands of ...
404  www.picturesofcats.biz/black-cats.html - 12k - Cached

406

Black Cat
Find, compare & buy. Compare & Buy from 1000's of Stores.
www.Shopping.com

We Have The Book You're Looking For
Spider-Man and the Black Cat: The Evil That Men Do By Kevin Smith.
www.HotBookSale.com/
free-shipping

Cat Black
Find cat black Online. Shop & Save at Target.com Today.
www.target.com

Buy Black Cat items Now
Find black cat items on the eBay Express Official Site.
www.eBayExpress.com "Black Cat" Anime DVD on SALE!!
Buy "Black Cat" Eng Dub TV Series DVD Boxset at 70% Discount Price.
www.animeballz.com
🛒 PayPal

Black Cats Picture

Yahoo! My Yahoo! Mail Welcome, alexcozzi Sign Out Help

YAHOO!

| black cat | Search | Options ▼ |

Web Images Video Local Shopping more ▶

1-10 of 129,000,000 for black cat (About) 0.09 sec        SPONSOR RESULTS

You striked 3 results on this page. Hide striked results. ~512

BLACK CAT - A Washington DC Night Club
Premier live music venue.
www.blackcatdc.com - 7k - Cached

510

~~Black Cat Fireworks - Black Cat Fireworks - The Best You Can Get~~ ~502
Manufacturer of fireworks and firecrackers.
www.blackcatfireworks.com - 10k - Cached ~~Black Cat - Wikipedia, the free encyclopedia~~ ~504
Historically, black cats were symbolically associated with...decided to use the black cat because in China black cats are a symbol of good luck. ...
Quick Links: Historical associations - Witchcraft and superstition - Anarcho-Syndicalism
en.wikipedia.org/wiki/Black_cat - 38k - Cached BLACK CAT - A Washington DC Night Club
Fri Jan 11-BLACK CAT atonia: 80s, hip hop, soul, electronica dance night w ... 6-STRIKE
ANYWHERE, PAINT IT BLACK, RIVERBOAT GAMBLERS $12 Mainstage 8:00 ...
www.blackcatdc.com/schedule.html - 17k - Cached ~~...... BLACK CATS ... SCREAM OF THE CATS ......~~ ~506
MAC users need to download OPERA internet browser in order to view this site. In order to fully
enjoy the site please turn off your POP-UP blocker ...
www.blackcats.net - 3k - Cached Black Cats
Black cats are discussed as mysterious and mythical creatures that have been ... if a black cat
on the one side of the world suffers misfortune at the hands of ...
www.picturesofcats.biz/black-cats.html - 12k - Cached Black Cats
Essay contrasts fear of black cats in European-American folklore with African-American belief that Black Cat
Find, compare & buy. Compare &
Buy from 1000's of Stores.
www.Shopping.com We Have The Book You're
Looking For
Spider-Man and the Black Cat: The
Evil That Men Do By Kevin Smith.
www.HotBookSale.com/
free-shipping Cat Black
Find cat black Online. Shop & Save
at Target.com Today.
www.target.com Buy Black Cat items Now
Find black cat items on the eBay
Express Official Site.
www.eBayExpress.com "Black Cat" Anime DVD on
SALE!!
Buy "Black Cat" Eng Dub TV Series
DVD Boxset at 70% Discount Price.
www.animeballz.com
PayPal Black Cats Picture
Explore 2,000+ Picture Frame

Fig.5B

SYSTEM, METHOD, AND/OR APPARATUS FOR REORDERING SEARCH RESULTS

FIELD

Embodiments of the invention relate to the field of search engines, and more specifically to modifying search results.

BACKGROUND

In light of the large amount of content and/or information available on the internet it may be advantageous to have a way to organize and/or search for one or more areas of interest. For example, a user may use one or more Internet search engines to identify potentially relevant content, such as by searching based on one or more key words related to an area of interest. Results from one or more search engines may be organized according to one or more formulas based on a determined relevancy of a particular page to the one or more key words. For additional example, a user may bookmark one or more locations of information and/or content that they may want to view again at a later time. Bookmarks may be organized into one or more folders, such as into a directory structure, for example. However, given the large amount of content and/or information available new solutions for organizing and search may be advantageous.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

FIGS. 4A and 4B are a depictions of interfaces for indicating one or more user preferences and displaying one or more reordered search results to a user; and FIGS. 5A and 5B are depictions of interfaces for displaying one or more reordered search results to a user.

DETAILED DESCRIPTION

Figure 1:
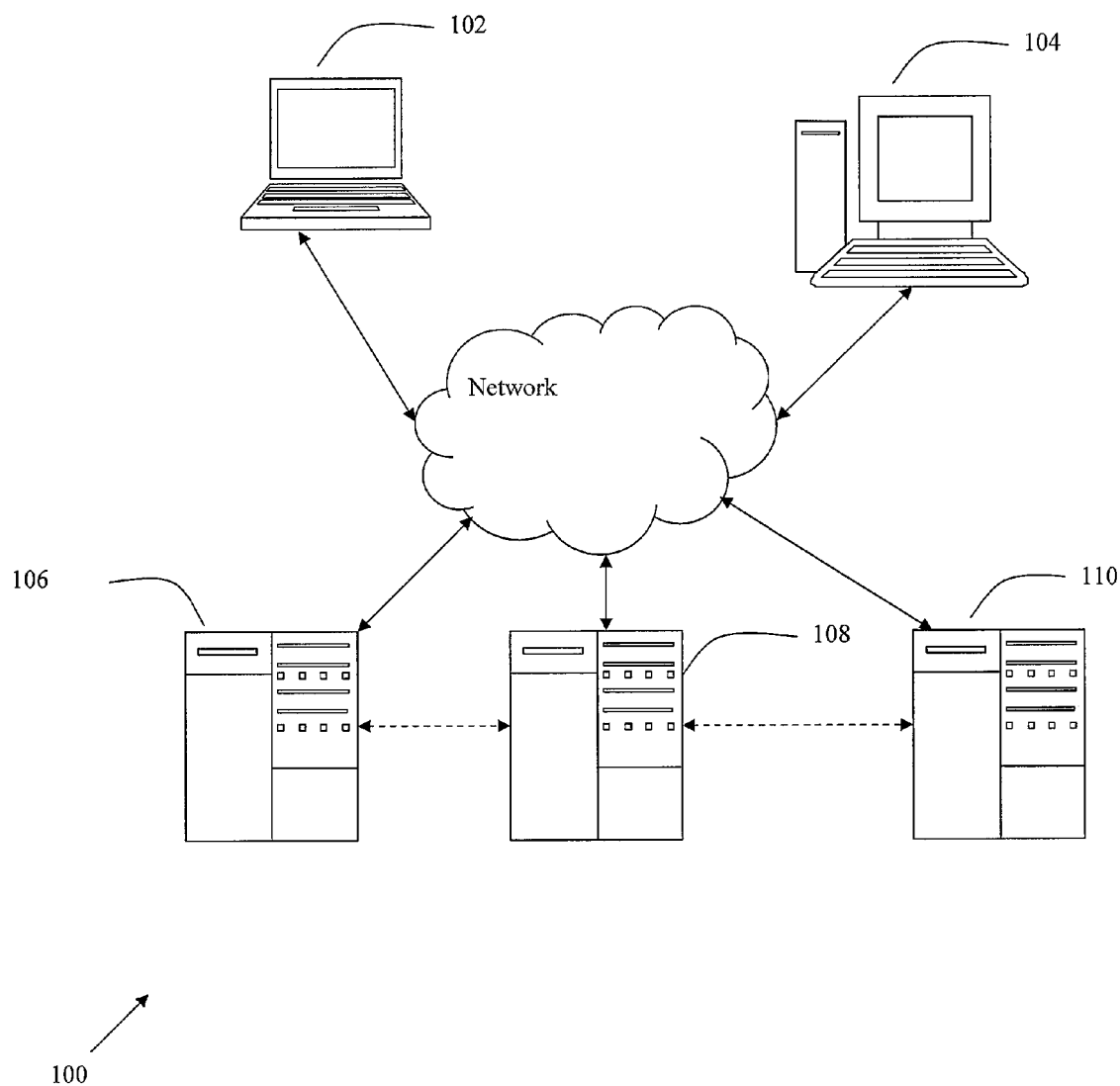
FIG. 1 is a schematic diagram of an embodiment, such as one or more computing platforms communicating with one or more servers.

In the following detailed description, numerous specific details are set forth to provide a thorough understanding of the claimed subject matter. However, it will be understood by those skilled in the art that the claimed subject matter may be practiced without these specific details. In other instances, methods, procedures, and/or components that would be known by one of ordinary skill have not been described in detail so as not to obscure the claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

Through the use of the Internet, users can access a large quantity of information on a variety of topics. However, under some circumstances it may be difficult for a user to locate information they are interested in. To address this problem, a mechanism known as a "search engine" may be employed to index a large number of web pages and provide an interface that may be used to search the indexed information, for example, by entering key words or phases.

A search engine may, for example, include or otherwise employ on a "crawler" (also referred to as "crawler", "spider", "robot") that may "crawl" the Internet in some manner to locate web documents. Upon locating a web document, the crawler may store the document's URL, and possibly follow any hyperlinks associated with the web document to locate other web documents.

A search engine may, for example, include information extraction and/or indexing mechanisms adapted to extract and/or otherwise index certain information about the web documents that were located by the crawler. Such index information may, for example, be generated based on the contents of an HTML file associated with a web document. An indexing mechanism may store index information in a database. A search engine may provide a search tool that allows users to search the database. The search tool may include a user interface to allow users to input or otherwise specify search terms, such as keywords, and receive and/or view search results. A search engine may present the search results in a particular order, such as according to a ranking scheme and/or a ranking process, for example.

Under some circumstances it may be desirable for a user to provide input relating to the search results. For example, a user may provide an indication that a particular search result is not relevant to a search query they initiated. For further example, a user may provide an indication that another search result is more relevant to such a search query. In addition, it may be desirable for those user preferences to be stored and/or associated with a particular user so that future search results may be modified to account for the preferences provided by a particular user. For example, it may be desirable to reorder search results associated with one or more key words for a particular user so that affirmatively or positively ranked (e.g. more relevant or useful) results are displayed more prominently while negatively ranked (e.g. less relevant or useful) results are displayed less prominently or removed from the search results displayed to the user. It may also be desirable to provide a user with one or more indication that the search results associated with the one or more key words displayed to the user have been reordered. It should however, be noted that these are merely illustrative examples relating to reordering search results and that claimed subject matter is not limited in these regards.

FIG. 1 is a schematic diagram of an embodiment 100, including one or more computing platforms, such as computing platforms 102 and/or 104. In this embodiment computing platform 102 and/or 104 may communicate with one or more servers, such as servers 106, 108, and/or 110, for example. In one particular embodiment, a user may initiate one or more searches by using an application program, such as a web browser, executed by a computing platform, such as computing platform 102, or computing platform 104 to communicate with one or more search engines. In an embodiment, a search engine may include one or more application programs and/or databases running on one or more servers, such as servers 106, 108, and/or 110, for example. In this embodiment, in response to a user search query, server 106 may search one or more databases at least in part to generate one or more search results. Server 106 may also transmit the one or more search results to computing platform 102 via the network. As mentioned above, the generated search results may be ranked according to a ranking scheme and/or ranking process. In an embodiment, a ranking scheme may attempt to order the results, at least in part, so that results that are more likely to be relevant are presented to the user in a more prominent manner than results that are less likely to be relevant. In addition, a ranking scheme may alter the ranking of particular results over time, such as in response to one or more changes in the content of one or more web sites listed in the results and/or changes in the perceived relevance of the content at the one or more web sites.

Figure 2:
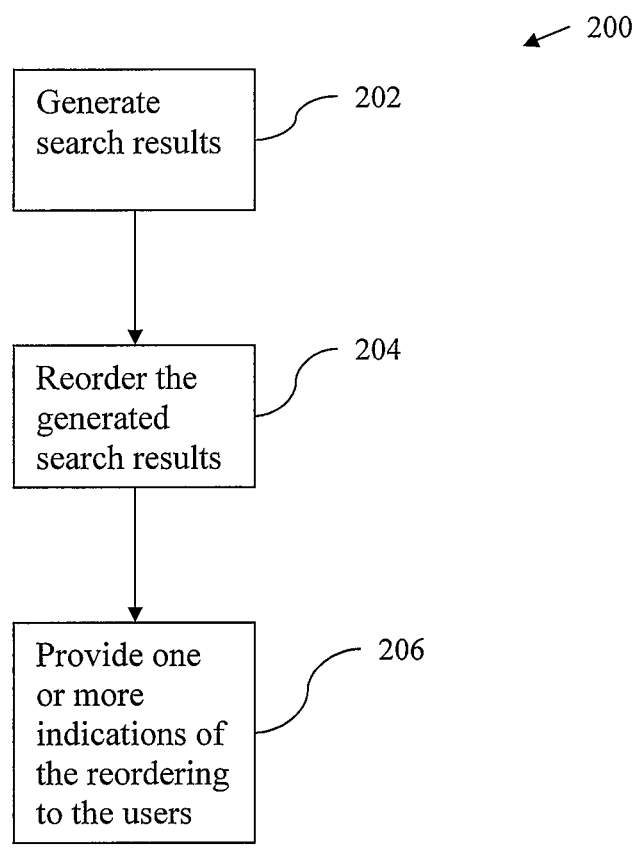
FIG. 2 is a flow chart of an embodiment, such as a method of reordering one or more search results.

FIG. 2 is a flow chart of an embodiment 200, such as a method or process of reordering one or more search results. With regard to box 202, a search engine, at least in part, in response to a search query, may generate a list of one or more search results. For example, a user may enter the search terms "black cat" into a search engine. The search engine may then generate a list of one or more search results corresponding to the search terms "black cat." The generated list of search results may, under some circumstances, be transmitted to a computing platform for display to the user via an application program such as a web browser, such as shown with regard to FIG. 4A, for example. Alternatively, as discussed more fully below, the generated list of search results may be modified, such as by reordering the generated search results, prior to being transmitted for display to the user.

With regard box 204, the generated search results may be modified or reordered, such as by one or more one servers 106, 108, and/or 110. In an embodiment, one or more user preferences may have been associated with the search query. For example, one or more user preferences associated with search results and/or search terms may have previously been stored, such as in one or more tables associated with the search engine and/or stored at one or more servers, such as one or more of servers 106, 108, and/or 110. In an embodiment, one or more user preferences may be associated with one or more search terms and stored in a hash table or other lookup table, for example. For example, a user may have previously provided affirmative and/or negative feedback to the search engine relating to one or more search results. In an embodiment, the search engine may use the provided feedback to reorder subsequent search results for the user as they appear to the user in a display. For example, in response to search results that received a positive or affirmative ranking, the search engine may reorder the search results so that the affirmatively ranked search results may be displayed more prominently, such as at or near the top of a list of search results. For an additional example, in response to search results that received a negative ranking, the search engine may reorder the search results to that the negatively ranked search results may be displayed less prominently, such as at or near the bottom of a list of search results or may be removed from the list of search results entirely.

With regard to box 206, the search engine may provide a user with one or more indications that search results have been reordered. For example, the search engine may generate one or more graphical elements to associate with individual search results that have been reordered in a display. In one embodiment, this may comprise associating a positive graphical element, such as a graphical representation of a push pin, with search results that have been displayed more prominently based on an affirmative user ranking, as shown in more detail with regard to FIG. 4B. Additionally, the search engine may associate a negative graphical element, such as a graphical depiction of a pair of scissors, with search results that have been displayed less prominently based on a negative user ranking, as shown in more detail with regard to FIG. 5A. Alternatively, the search engine may provide an indication that results have been reordered and/or stricken from the search results, which may, under some circumstances comprise a clickable URL that may allow the user to see a display of the generated search results without the reordering, such as shown with regard to FIG. 5B.

Figure 3:
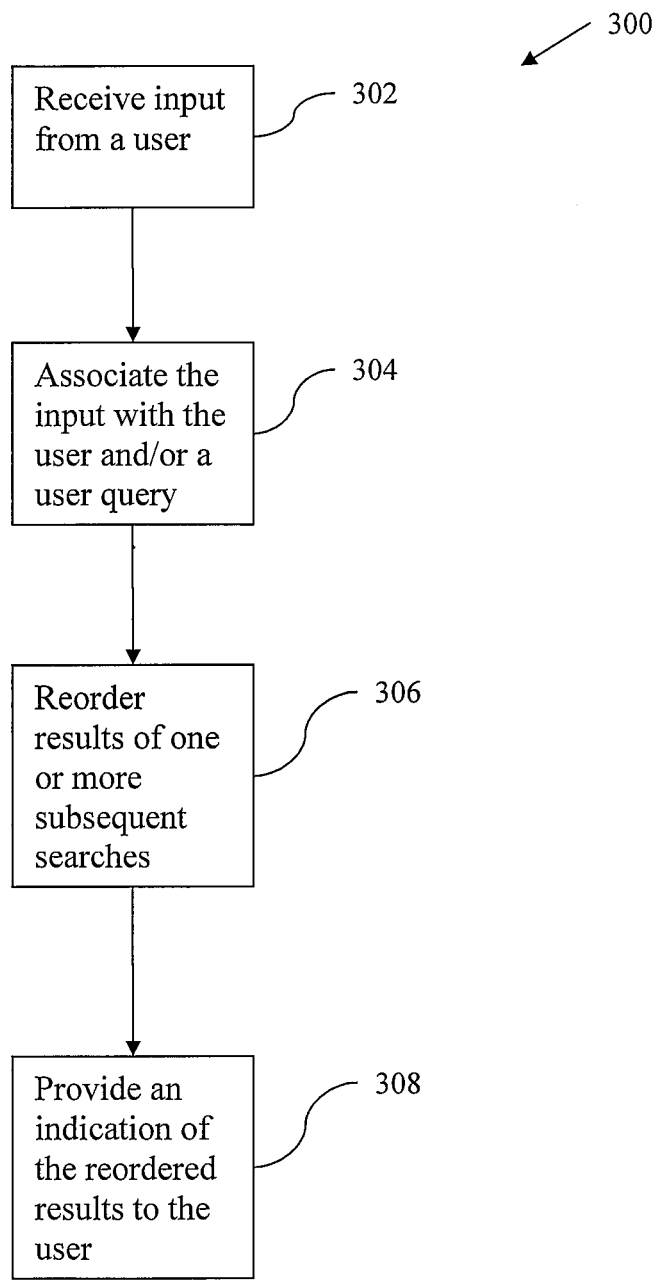
FIG. 3 is a flow chart of an embodiment, such as a second method of reordering one or more search results.

FIG. 3 is a flow chart of an embodiment 300, such as an additional method or process of reordering one or more search results. With regard to box 302, a search engine may receive one or more user inputs relating to one or more search results. For example, in response to a user input of a search query, such as "black cat," the search engine may generate a list of one or more search results and transmit the generated list to a computing platform, such as computing platform 102 and/or 104, for display to a user. In an embodiment, the search engine may also provide one or more user selectable elements along with the generated search results. In at least one embodiment, user selectable elements may comprise one or more user clickable buttons, which under some circumstances, may allow the search engine to receive input from a user relating to the generated search results. For example, the search engine may provide an affirmative and/or a negative user clickable element associated with each search result displayed to a user. In an embodiment, if a user clicks on one of the user clickable elements that user preference and/or input may be transmitted to, and/or received by, the search engine.

With regard to box 304, the search engine may associate the received input with the user who provided the input and/or one or more of the search terms from the search query. For example, the search engine may store the received user input in one or more tables, such as a hash table or other database table, and associate the stored input with the user and/or the search query, at least in part so that the stored input may be used in conjunction with one or more future search queries. In an embodiment, the search engine may search the one or more tables for stored user input before providing future search results to a particular user, such as a registered and/or signed in user, for example. In at least one embodiment, the search engine may look up the user and/or the search query to determine stored user preferences at least in part to determine if one or more subsequent search results should be modified.

With regard to box 306, the search engine may reorder the results of one or more subsequent searches based at least in part on the received user input. For example, if a user has previously provided input relating to search results associated with the search query "black cat," the search engine may modify subsequent search results for that search query for that user, such as by more prominently displaying affirmatively ranked search results and less prominently displaying negatively ranked search results. In this way a user may be able to more quickly reach search results that the user finds particularly relevant to one or more search terms. In an embodiment, the reordering may comprise placing affirmatively ranked search results at or near the beginning of displayed search results while removing or de-emphasizing negatively ranked search results.

With regard to box 308, the search engine may further provide a user with one or more indications of the reordered search results. For example, the search engine may associate one or more graphical elements with any reordered search results on a display. In an embodiment, a positive graphical element, such as a pin, for example, may be associated with affirmatively ranked search results while a negative graphical element, such as a pair of scissors, for example, may be associated with negatively ranked search results on a display. For additional example, negatively ranked search results may be removed from the displayed search results. In this example, the search engine may provide a user with an indication that negatively ranked results have been removed, such as a clickable link that may allow a user to request the search engine to display the negatively ranked results. In this way a user may view previously negatively ranked search results, or, under some circumstances, a user may undo previous negative rankings.

In a particular illustrated implementation, FIGS. 4A, 4B, 5A, and 5B, search engine interfaces may be displayed in a browser to a user and may receive inputs from the user through a graphical user interface (GUI). For example, a user may access a search engine using a web browser executing on a computing platform capable of communicating with a network, as discussed above with regard to FIG. 1. The web browser may allow the user to input one or more queries and/or provide other feedback to the search engine via the GUI. For example, the GUI may allow the user to initiate one or more searches based on one or more search queries. Likewise, the GUI may, under some circumstances, allow the user to provide feedback relating to one or more displayed search results.

FIG. 4A is a depiction of a search engine interface 400 for indicating one or more user preferences. With regard to FIG. 4A, a user may enter a search query, such as one or more search terms, such as in box 402, for example. In response to the user submitting the search query, a search engine may generate one or more search results. In an embodiment, the search results may be displayed to a user as a list, with the placement of individual search results within that list based at least in part on one or more ranking algorithms and/or ranking processes associated with the search engine. For example, a ranking process may attempt to display more likely relevant results to a user before less likely relevant results at least in part by placing more likely results at or near the top of a list of the search results. The search engine may, under some circumstances, provide an interface for a user to provide feedback relating to the displayed results. In this embodiment, the interface may comprise one or more user selectable graphical elements, such as one or more URLs, Java elements, and/or the like, displayed in a GUI which may receive user inputs from an input device (e.g. mouse or other pointer device) associated with a computing platform. For example, a push pin icon, such as push pin icon 404, may represent an affirmative ranking, while a scissors icon, such as scissors icon 406, may represent a negative ranking. In this example, a user could click on one of the push pin icons to indicate that an adjacent search result is of particular relevance to that user. Likewise, the user could click on one of the scissors icons to indicate that an adjacent search result is not of particular relevance to that user. Any user feedback provided by the user selectable graphical elements may be transmitted, using one or more network protocols, to the search engine. The search engine may, in turn, associate the user feedback with the user and/or any search terms from the search query, such as by storing the information in one or more tables, for example.

Figure 4B:
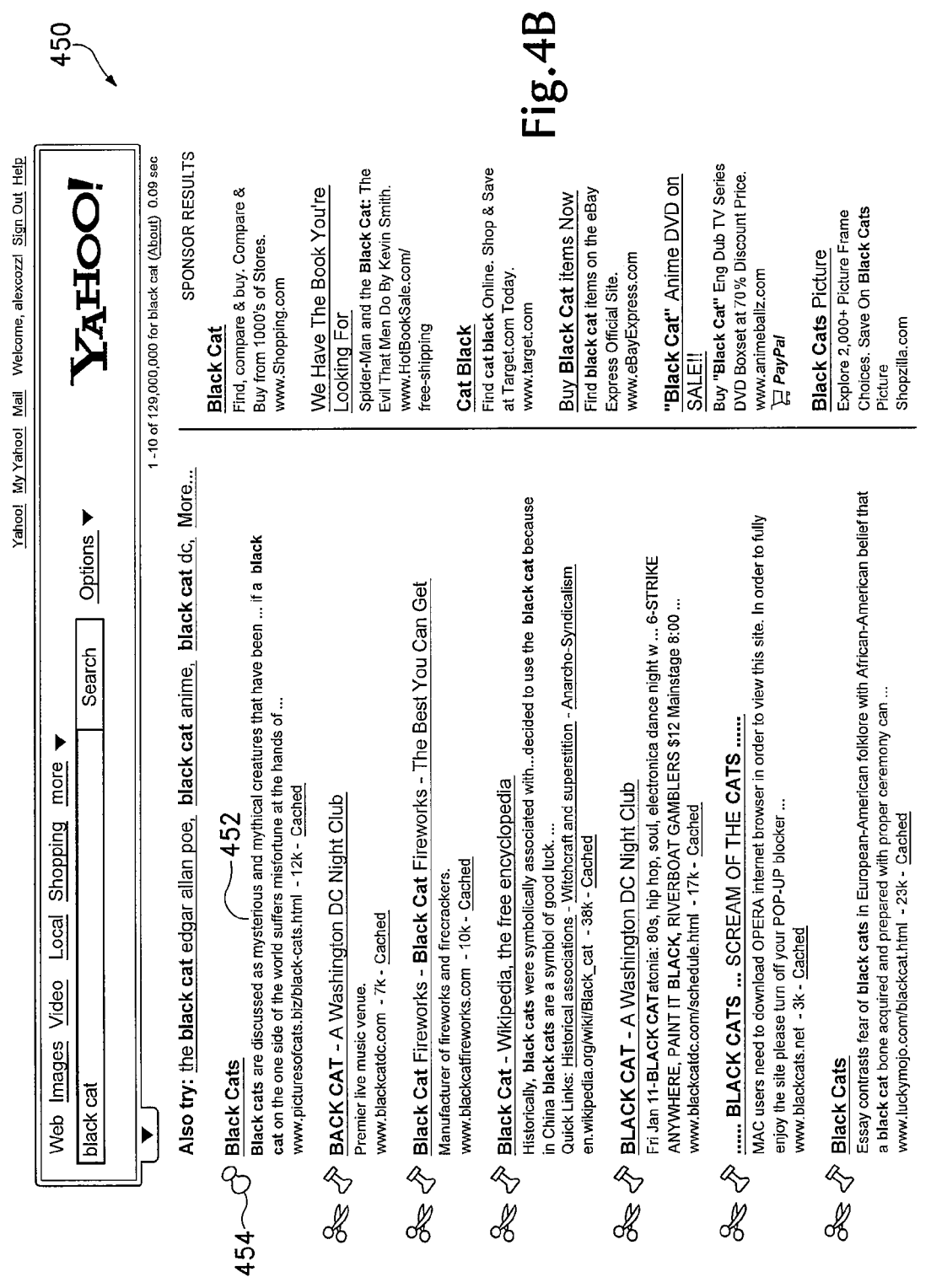

FIG. 4B is a depiction of a search engine interface 450 for displaying one or more reordered search results to a user. With regard to FIG. 4B, the search engine may reorder the search results based at least in part on previously received user input. For example, if the user once again enters the search query "black cat," the search engine may look up the user and/or the search terms at least in part to determine if one or more user preferences have been stored in association with the search query entered. For example, if a user has verified their identity to the search engine, such as by logging into to a web site associated with the search engine, the search engine may be able to determine stored user preferences associated with the user and/or the search query. In this example, the user may have previously provided an affirmative ranking for search result 452. The search engine may be able to determine one or more user provided preferences based on the user's identity and/or the search terms and may be able to reorder the search results so that result 452 is displayed more prominently than other search results. In an embodiment, the search engine may also provide the user with an indication that the search results have been reordered. Here in this example, the indication that the search results have been reordered may comprise a graphical indication, such as push pin 454, which may be shown as having graphically "pinned" search result 452.

FIG. 5A is a depiction of an interface 500 for displaying one or more reordered search results to a user. With regard to FIG. 5A, the search engine may reorder the search results based at least in part on previously received user input. For example, if the user once again enters the search query "black cat," the search engine may look up the user and/or the search terms at least in part to determine if one or more user preferences have been stored in association with the search query entered. For example, if a user has verified their identity to the search engine, such as by logging into to a web site associated with the search engine, the search engine may be able to determine stored user preferences associated with the user and/or the search query. In this example, the user may have previously provided a negative ranking for one or more search results, such as search results 502, 504, and/or 506. The search engine may be able to determine one or more user provided preferences based on the user's identity and/or the search terms and may be able to reorder the search results so that results 502, 504, and/or 506 are displayed less prominently than other search results. In an embodiment, the search engine may also provide the user with an indication that the search results have been reordered. Here, in this example, the indication that the search results have been reordered may comprise a graphical indication, such as a pair of scissors 510, which may be shown as having graphically "stricken" search result 502. In addition, the search engine may depict result 502 as having been stricken by displaying text associated with search result 502 in strikethrough format. Under some circumstances, the search engine may further provide the user with additional options as to modify the display of reordered search results. For example, the user could click on link 512 to hide the stricken results from view so that no search results having received negative feedback are displayed in response to a search query.

Figure 5B:
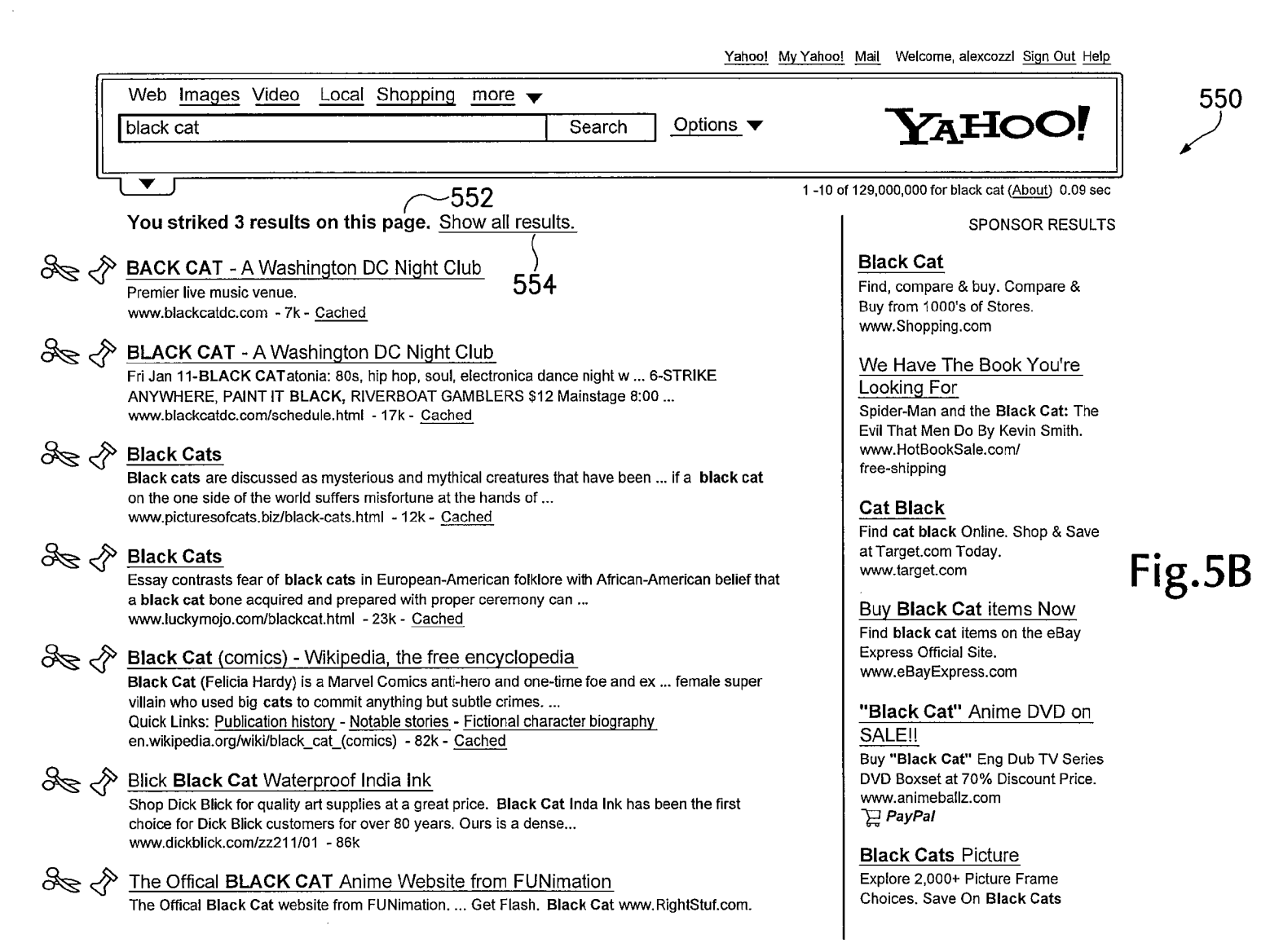

FIG. 5B is a depiction of an interface 550 for displaying one or more reordered search results to a user. With regard to FIG. 5B, the search engine may reorder the search results based at least in part on previously received user input. For example, if the user once again enters the search query "black cat," the search engine may look up the user and/or the search terms at least in part to determine if one or more user preferences have been stored in association with the search query entered. For example, if a user has verified their identity to the search engine, such as by logging into to a web site associated with the search engine, the search engine may be able to determine stored user preferences associated with the user and/or the search query. In this example, the user may have previously provided a negative ranking for one or more search results (shown above with regard to FIG. 5A). The search engine may be able to determine one or more user provided preferences based on the user's identity and/or the search terms and may be able to reorder the search results so that the negatively ranked search results are displayed less prominently than other search results. In this example, the negatively ranked search results are not shown in the list of search results. In an embodiment, the search engine may also provide the user with an indication that the search results have been reordered. Here, in this example, the search engine provides the user with an indication 552, that search results have previously been stricken, and provides the user with a selectable option 554 to show the previously stricken results. In this way, if the user wishes to see previously stricken results that option is available to the user. In addition, under some circumstances a user may wish to change preferences associated with one or more search results. For example, the user may desire to remove a negative ranking and/or switch a negative ranking to a positive ranking, or vice versa. By allowing the user access to previous rankings, the search engine allows the user to alter their preferences over time, while still reordering subsequent search results based on previously received user rankings.

In the preceding description, various aspects of claimed subject matter have been described. For purposes of explanation, specific numbers, systems and/or configurations were set forth to provide a thorough understanding of the claimed subject matter. However, it should be noted that although various embodiments have been described in terms of the above example, the above examples were merely illustrative example relating to search results and that claimed subject matter is not limited in these regards. However, it should be apparent to one skilled in the art having the benefit of this disclosure that claimed subject matter may be practiced without the specific details. In other instances, features that would be understood by one of ordinary skill were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method comprising:
generating search results based on a received search query associated with a particular user, the generated search results being ranked in a particular order;
accessing user preferences of the particular user, the user preferences being based at least in part on one or more user inputs provided in connection with one or more prior search results, the user preferences having been previously associated, in a memory device coupled to a computing platform, with the particular user;
reordering the generated search results based at least in part on the user preferences of the particular user; and
generating one or more indications to indicate whether a placement of a particular search results of the generated search results has been made more prominent or less prominent at least partially in response to the reordering.

2. The method of claim 1, wherein said one or more user inputs comprise an affirmative ranking or a negative ranking.

3. The method of claim 1, wherein said reordering comprises prioritizing one or more search results.

4. The method of claim 3, wherein said reordering comprises removing one or more search results.

5. The method of claim 4, wherein prioritizing one or more search results comprises moving said one or more results to a position at or near a beginning of the search results.

6. A method comprising:
receiving input from a user relating to one or more search results determined at least partially in response to receiving one or more search queries from said particular user;
in a memory device coupled to a computing platform, storing an associating of the user input with said one or more search queries previously submitted by said particular user;
generating search results based at least in part on one or more subsequently received search queries of the particular user, the generated search results being ranked in a particular order; and
reordering results of one or more subsequent searches of the particular user, at least partially in response to the received user input from the particular user to modify the particular order of the generated search results; and
generating one or more indications to indicate whether a placement of a particular search result of the generated search results has been made more prominent or less prominent at least partially in response to the reordering.

7. The method of claim 6, wherein said one or more subsequent searches were initiated in association with said user.

8. The method of claim 6, wherein the received input comprises an affirmative ranking or a negative ranking.

9. The method of claim 6, wherein said reordering comprises prioritizing one or more results from said one or more subsequent searches.

10. The method of claim 9, wherein said reordering comprises removing one or more results from said one or more subsequent searches.

11. The method of claim 10, wherein prioritizing one or more search results comprises moving said one or more results to a position at or near a beginning of the search results.

12. A system comprising:
a memory device to store user preferences of a particular user;
one or more computing platforms, said one or more computing platforms operable to generate search results based at least in a part on a search query of the particular user, said one or more computing platforms to further access user preferences stored in the memory device and associated with the particular user, the user preferences being based at least in part on one more user inputs provided in connection with one or more prior search results, the user preferences having been previously of the particular user; and
said one or more computing platforms to further:
reorder the generated search results based at least in part on the user preferences for the particular user, and
generate one or more indications to indicate whether a placement of a particular search results of the generated search result has been made more prominent or less prominent at least partially in response to the reordering; and
a network interface in communication with an electronic communications network to receive the one or more user inputs and communicate reordered generated search results.

13. The system of claim 12, wherein said one or more user inputs comprise an affirmative ranking or a negative ranking.

14. The system of claim 12, wherein said one or more computing platforms are operable to reorder the generated search result at least in part by prioritizing one or more search results.

15. The system of claim 14, wherein said one or more computing platforms are operable to reorder the generated search result at least in part by removing one or more search results.

16. The system of claim 12, wherein said one or more servers are operable to prioritize at least in part by moving said one or more results to a position at or near a beginning of the search results.

17. An article comprising: a storage medium having stored thereon instructions that are executed by a computing platform to:
    process a received user input from a particular user relating to one or more search results determined at least partially in response to receiving one or more search queries from said particular user;
    store an association of the user input with said one or more search queries previously submitted by said particular user;
    generate search results based at least in part on one or more subsequently received search queries of the particular user, the generated search results being ranked in a particular order;
    reorder results of one or more subsequent searches of the particular user, at least partially in response to the received user input from the particular user to modify the particular order of the generated search results; and
    generate one or more indications to indicate whether a placement of a particular search results of the generated search results has been made more prominent or less prominent at least partially in response to the reordering.

18. The article of claim 17, wherein said one or more subsequent searches are initiated in association with said user.

19. The article of claim 17, wherein the received input comprises an affirmative ranking or a negative ranking.

20. The article of claim 17, wherein said instructions are further executable by said computing platform to prioritize one or more results from said one or more subsequent searches.

21. The article of claim 20, wherein said instructions are further executable by said computing platform to remove one or more results from said one or more subsequent searches.

22. The article of claim 21, wherein said instructions are further executable by said computing platform to move said one or more results to a position at or near a beginning of the search results.

* * * * *